United States Patent [19]

Saleh et al.

[11] Patent Number: 5,283,318
[45] Date of Patent: Feb. 1, 1994

[54] PROCESS FOR DEPOLYMERIZATION OF BUTYL RUBBERS AND HALOBUTYL RUBBERS USING HOT LIQUID WATER

[75] Inventors: Ramzi Y. Saleh, Flemington; Michael Siskin, Livingston; George Knudsen, Scotch Plains, all of N.J.

[73] Assignee: Exxon Research and Engineering Company, Florham Park, N.J.

[21] Appl. No.: 812,175

[22] Filed: Dec. 20, 1991

[51] Int. Cl.$^5$ .............................. C08F 6/04
[52] U.S. Cl. ...................... 528/481; 528/499
[58] Field of Search ................... 528/481, 499

[56] References Cited

U.S. PATENT DOCUMENTS

| | | | |
|---|---|---|---|
| 1,805,712 | 5/1931 | Bradley et al. | 528/499 |
| 3,083,193 | 3/1963 | Kolner et al. | 528/481 |
| 3,634,381 | 1/1972 | Lehnerer | 528/481 |
| 3,683,511 | 8/1972 | Johnson et al. | 528/500 |

FOREIGN PATENT DOCUMENTS 1016295 8/1952 France.
1266746 6/1961 France.

OTHER PUBLICATIONS

European Search Report for EP 92311503 and communication dated Dec. 5, 1993.

*Primary Examiner*—Joseph L. Schofer
*Assistant Examiner*—Tom Weber
*Attorney, Agent, or Firm*—Linda M. Scuorzo

[57] ABSTRACT

The present invention relates to a process for depolymerizing and dehalogenating rubber materials by heating the rubber materials with neutral liquid water at temperatures from about 200° C. up to the critical temperature of water at autogenous pressure. The process has utility in degrading rubber materials, and further does not release hydrogen halogen into a gas phase.

7 Claims, No Drawings

PROCESS FOR DEPOLYMERIZATION OF BUTYL RUBBERS AND HALOBUTYL RUBBERS USING HOT LIQUID WATER

BACKGROUND OF THE INVENTION

1. Field of the Invention

The present invention relates to a process for degrading by depolymerization butyl rubbers and halobutyl rubbers and mixtures thereof by heating with liquid water at high temperatures.

2. Discussion of Related Art

Butyl rubbers and halobutyl rubbers find widespread use in industrial applications, particularly as a component in rubber tires. Processes that facilitate the degradation of rubber-containing materials can provide more environmentally safe means for eliminating these products from waste streams. Further, unlike thermal degradation processes, applicants' process, when applied to halogenated butyl rubbers, decreases the halogen content of the rubber material by releasing halogens as a hydrogen halide into an aqueous layer.

SUMMARY OF THE INVENTION

The present invention relates to a process for degrading butyl rubbers by depolymerization to lower molecular weight organic compounds using hot liquid water. The butyl rubbers are preferably butyl rubber, halobutyl rubbers and mixtures thereof. Where the butyl rubbers contain halogen groups, the process also may be used to dehalogenate same. The process involves contacting the starting materials of butyl rubber, halobutyl rubber and mixtures thereof and liquid water (pH of 7.0) at a temperature from about 200° C. up to the critical temperature of water, more preferably from about 200° C. to about 350° C. for from about 112 hour to about 6 hours, at the corresponding pressure generated at the particular reaction temperature at autogenous pressure, which typically for water will be from about 225.45 psi at 200° C. to about 2397.9 psi, at 350° C. depending on the temperature of the system. The process has utility in rubber degradation by depolymerization and, where halogens are present, dehalogenating compounds that currently form a major component of the waste stream and are not easily biodegradable.

DETAILED DESCRIPTION OF THE INVENTION

The process of the present invention is used to promote the degradation of rubber materials, preferably butyl rubbers, halobutyl rubbers and mixtures thereof by depolymerization in hot liquid water to organic components and further, where the starting rubber is a halobutyl rubber, the organic components have a lower halogen content than the starting rubber and the halogen so removed is released into the liquid phase rather than as a gas. Thus the process facilitates the removal of butyl rubbers and halobutyl rubbers from the waste stream.

The rubber materials that may be degraded by the process of the present invention are commercially available and may be made by processes which are well known to one having skill in the art. The rubber materials may be obtained as finely divided particles or suspensions. However, waste or scrap is equally usable in the process of the present invention, provided that it is cut or otherwise reduced to pieces of a size that can be accommodated in the reaction vessel. It is preferred that the pieces be of sufficiently small in size to be capable of forming a suspension in the water. The rubbers are preferably butyl rubbers, halobutyl rubbers and mixtures thereof.

In the process of the present invention, the starting materials, neutral liquid water (pH of 7.0) and the rubber materials are contacted and heated at a temperature from about 200° C. to the critical temperature of water, which is about 374° C., preferably from about 200° C. to about 350° C. The contacting is carried out at autogenous pressure (i.e., the combined vapor pressure that is generated by the mixed components of the system at the particular reaction temperature), which typically, for liquid water alone will be from about 225.45 psi at 200° C. to about 2397.79 psi at 350° C. Pressures of liquid water at various temperatures within the above temperature range can readily be determined by one having ordinary skill in the art from standard reference texts. See, e.g., CRC Handbook of Chemistry and Physics, 61st Edition, p. D-197 (1980-1981). The contacting is carried out for a time sufficient to depolymerize the rubber materials. Where halobutyl rubbers are present, the contacting depolymerizes the halobutyl rubbers to organic compounds and dehalogenates it by releasing hydrogen halide into a liquid phase. The time required for the process is typically from about ½ hour to about 6 hours. The process may be carried out using neutral water or deoxygenated water as a starting material (i.e., pH 7.0). Applicants have found that the use of deoxygenated water can minimize undesirable side reactions. The process does not require a catalyst as a starting material.

The process of the present invention produces organic compounds of varying lower molecular weights than the starting rubber materials consisting mainly of C, H and O. Further in the process of the present invention, where the starting rubber material contained a halogen, it is removed in the liquid phase as a hydrogen halide having the formula HX, wherein X is the halide corresponding to the halogen contained in the starting material. Thus, chlorine is removed as HCl; bromine as HBr. The aqueous phase contains hydrogen halides. The halides may be neutralized and/or separated from the water soluble organic compounds by any conventional method known to one having ordinary skill in the art.

The invention will be further understood, but not limited by, reference to the following examples.

EXAMPLE 1

A 0.6 g sample of chlorobutyl rubber pieces (approximately ⅛ inch) was added to 5 g of deoxygenated liquid water (pH 7.0) and heated to 350° C. in a sealed minireactor for 1 hour. At the end of the time period, the reaction mixture was cooled to room temperature. The insoluble chlorobutyl rubber was depolymerized to a liquid organic material. Further, the pH of the solution was approximately 4.0, indicating that chlorine had been liberated from the starting material to produce HCl in the liquid phase. The starting material contained 1.81 wt. % chlorine, the products of the reaction contained 0.66 wt. % chlorine, a decrease of 63.5 wt. %.

EXAMPLE 2

The process of Example 1 was repeated using bromobutyl rubber. The insoluble bromobutyl rubber was depolymerized to a liquid material. Further, the pH of the solution decreased to approximately 4.0 from a pH of 7.0, indicating that the starting material had been dehalogenated to produce HBr in the liquid phase. The starting material contained 1.62 wt. % bromine, the products of the reaction contained 1.16% bromine, a decrease of 28.4%.

What is claimed is:

1. A process for degrading rubber materials into lower molecular weight organic components comprising: contacting the starting materials of neutral liquid deoxygenated water and a rubber material selected from the group consisting of, halobutyl rubbers at a temperature from about 200° C. up to the critical temperature of water at autogenous pressure for a time sufficient to produce said lower molecular weight organic compounds.

2. The process of claim 1 wherein the contacting is at a temperature from about 200° C. to about 350° C.

3. The process of claim 1 wherein the contacting is carried out for a time from about ½ to about 6 hours.

4. The process of claim 1 wherein the halobutyl rubbers are dehalogenated by said contacting.

5. The process of claim 4 wherein the dehalogenation produces hydrogen halide in a liquid phase.

6. The process of claim 1 wherein the halobutyl rubber is selected from the group consisting of chlorobutyl rubber and bromobutyl rubber.

7. The process of claim 1 wherein the contacting dehalogenates and depolymerizes the halobutyl rubber.

* * * * *